US012587834B2

(12) United States Patent
Li

(10) Patent No.: US 12,587,834 B2
(45) Date of Patent: Mar. 24, 2026

(54) CLOUD-BASED SIM

(71) Applicant: Boost SubscriberCo L.L.C.,
Englewood, CO (US)

(72) Inventor: Yongjia Li, Greenwood Village, CO (US)

(73) Assignee: Boost SubscriberCo L.L.C.,
Englewood, CO (US)

( * ) Notice: Subject to any disclaimer, the term of this patent is extended or adjusted under 35 U.S.C. 154(b) by 438 days.

(21) Appl. No.: 18/170,955

(22) Filed: Feb. 17, 2023

(65) Prior Publication Data

US 2024/0284166 A1     Aug. 22, 2024

(51) Int. Cl.
*H04W 8/24*      (2009.01)
*H04L 45/00*     (2022.01)
*H04W 12/71*     (2021.01)

(52) U.S. Cl.
CPC ........... *H04W 8/245* (2013.01); *H04L 45/563* (2013.01); *H04W 12/71* (2021.01)

(58) Field of Classification Search
CPC ...... H04W 8/245; H04W 12/71; H04L 45/563
See application file for complete search history.

(56) References Cited

U.S. PATENT DOCUMENTS

| | | | | |
|---|---|---|---|---|
| 10,560,895 B2 * | 2/2020 | Freienstein | ......... | H04W 52/028 |
| 2010/0135199 A1 * | 6/2010 | Nordin | .................... | H04L 67/04 |
| | | | | 370/328 |
| 2020/0178070 A1 * | 6/2020 | Yang | ..................... | H04W 8/245 |
| 2020/0322782 A1 * | 10/2020 | Gong | .................... | H04W 8/205 |

* cited by examiner

*Primary Examiner* — Kathy W Wang-Hurst
(74) *Attorney, Agent, or Firm* — Jeremiah J. Baunach; Frontier IP Law PLLC

(57)          ABSTRACT

A computer-implemented method for communicating with a cloud SIM software. The method includes activating, on a user equipment (UE), a communication module, and connecting with a cloud SIM software located on a remote server. The method also includes sending, from the UE, a request for content to the cloud SIM software, and receiving, by the UE, the content from the cloud SIM software to a local chip on the UE to facilitate communication between the UE and one or more other UEs.

14 Claims, 3 Drawing Sheets

Server

115

UE 110          120

110

CLOUD-BASED SIM

FIELD

The present invention generally relates to subscriber identity module (SIM) card technology, and more particular, to a cloud-based SIM.

BACKGROUND

A SIM allows user equipment (UE), such as mobile devices, desktop computers with appropriate hardware, vehicle telecommunications systems, etc., to be identified and authenticated on a network. The user is identified by the international mobile subscriber identity (IMSI) number associated with the SIM. The SIM identifies which service provider network that the UE connects with.

Network service providers may provide customers with a device with a preinstalled SIM for their network, or users may insert a SIM for the network into their own device. The SIM may also be associated a phone number for the device. A SIM may be a physical SIM (pSIM) or an embedded SIM (eSIM). A pSIM is a physical card that is inserted into an associated slot in the UE. An eSIM, on the other hand, is a digital version of a pSIM including a profile that can be downloaded to a mobile device to provide functionalities of a pSIM.

Currently, 5G devices with dual SIM support are available where UE can utilize a pair of SIMs, whether physical SIMs, eSIMs, or one of each. With 5G technology, SIMs have been evolving over the last 40 years, and have changed from different form factors (FF) physically. For example, SIM card technology has changed from ID card FF to a SIM card or chip within the UE. With current UE technology being at the electronic SIM (or E-SIM) stage, UEs now include software and/or deliverables downloaded to the physical hardware within the ME.

However, with pSIM or current eSIM technology, the content of the SIM resides within the UE, either existing in pSIM and then physically inserted into the UE, or remotely downloaded onto dedicated memory storage of the UE.

When a pSIM is used, the physical cards have to be manufactured, personalized with different content like keys and IDs, and delivered to Mobile Network Operators or OEMs. Then, the pSIMs need to be stored and distributed to retail stores or factories. All these steps cause delay and cost of logistics, making the use of pSIMs inefficient.

With an eSIM, a dedicated server or platform manages the download/delivery of the eSIMs to different UEs. This may cause logistics problem, e.g., failure of delivery for platform or UE problems, delay at first setup, download traffic at peak time, re-download at change of eSIM, memory shortage for storing more eSIMs on the UE, etc.

Accordingly, an improved and/or alternative approach may be beneficial.

SUMMARY

Certain embodiments of the present invention may provide solutions to the problems and needs in the art that have not yet been fully identified, appreciated, or solved by current communication technologies, and/or provide a useful alternative thereto. For example, some embodiments of the present invention pertain to a cloud-based SIM software eliminating the requirement for a SIM, pSIM, eSIM, etc., within the UE.

In an embodiment, a computer-implemented method for communicating with a cloud SIM software includes activating, on a mobile device, a communication module configured to communicate with the cloud SIM software, and connecting, by the mobile device, the communication module with the cloud SIM software located on a remote server. The method also includes sending, from the mobile device, a request for content from the communication module to the cloud SIM software. The method further includes receiving, by the mobile device, the content from the cloud SIM software to a local chip on the mobile device, the content is configured to facilitate communication between the mobile device and one or more other mobile devices.

In another embodiment, a system includes a mobile device and a remote server. The mobile device is configured to activate a communication module, and connect the communication module with a cloud SIM software located on a remote server. The mobile device is further configured to send a request from the communication module for content to the cloud SIM software. The mobile device is also configured to receive the content from the cloud SIM software to a local chip on the mobile device, facilitating communication between the mobile device and one or more other mobile devices.

In yet another embodiment, a mobile device includes memory comprising a set of instructions and at least one processor. The set of instructions are configured to cause the at least one processor to execute sending a request from a communication module for content to a cloud SIM software. The set of instructions are further configured to cause the at least one processor receiving the content from the cloud SIM software to a local chip on the mobile device to facilitate communication between the mobile device and one or more other mobile devices. The communication module is located on the mobile device and the cloud SIM software is located on a remote server.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 is an architectural diagram illustrating a cloud SIM network, according to an embodiment of the present invention.

Unless otherwise indicated, similar reference characters denote corresponding features consistently throughout the attached drawings.

DETAILED DESCRIPTION OF THE EMBODIMENTS

Figure 2:
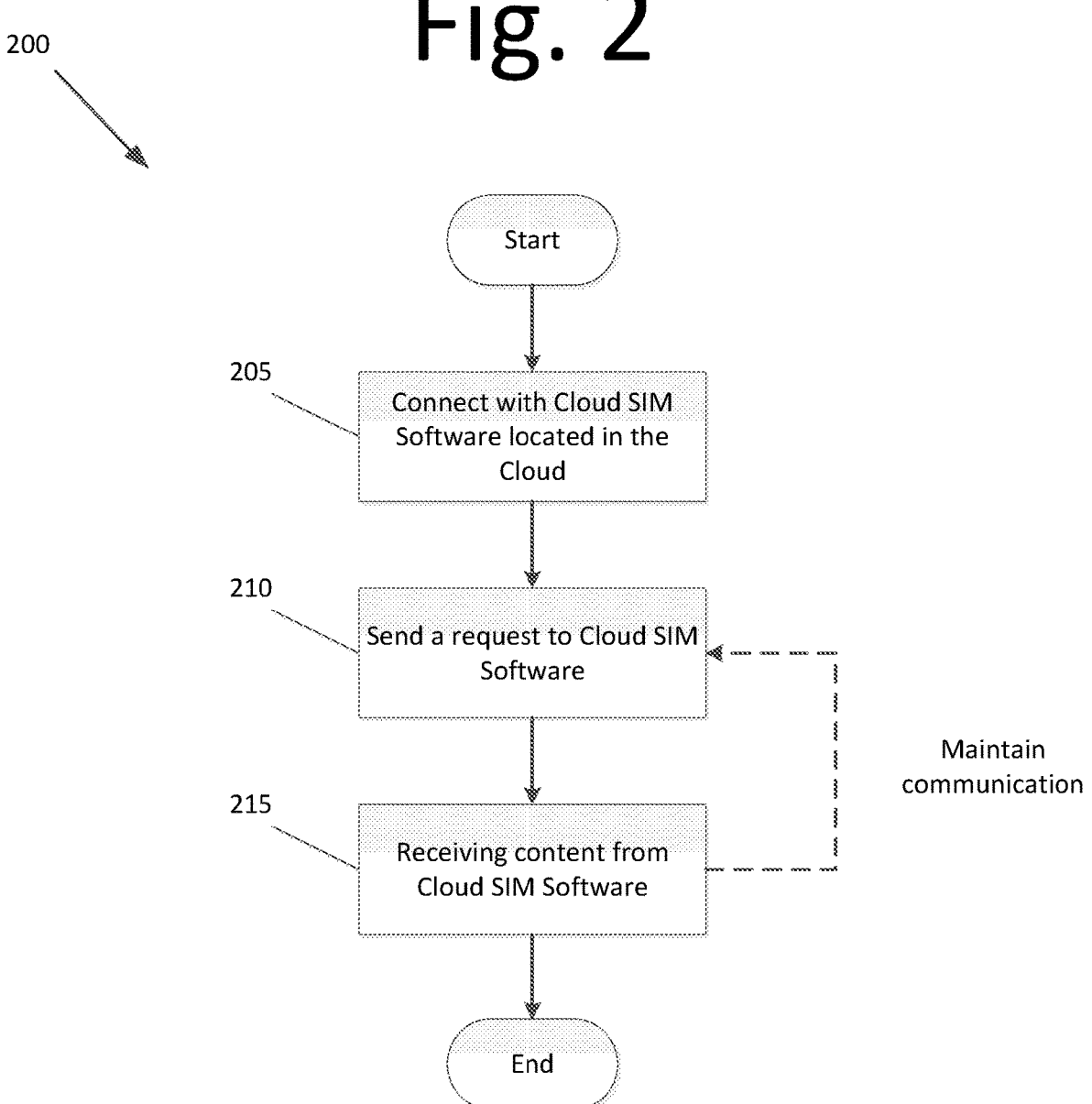
FIG. 2 is a flow diagram illustrating a process for connecting to the cloud-based SIM to increase execution time, according to an embodiment of the present invention.

Some embodiments of the present invention generally pertain to a cloud-based SIM card; referred to as cloud SIM or cloud SIM software. With cloud SIM, the content of the SIM card (i.e., the software itself) should be free from the physical hardware within the UE. In other words, the software should be separated from the physical device, and should be stored somewhere in the cloud.

This way, whenever the UE needs to access the content of the SIM card, the UE may communicate with the cloud SIM software, which is in the cloud. Content for purposes of explanation may include authentication, calculation, security token, content of the SIM card, etc.

In some embodiments, there is a provisioning process. The provisioning process is controlled by the Mobile Network Operator (MNO), where an available eSIM stored in a cloud Server is assigned to a registering UE. Once associated, the communication channel between the UE and the assigned eSIM is established, and the UE treats this eSIM as if it was local, and sends its commands to the eSIM and expects responses from the eSIM, over the air.

These cloud-based eSIMs (i.e., the cloud SIM software) function as current-days' pSIM or eSIM, but allow real-time access from UEs over the air, to get no matter the file structure and contents of the SIMs, or functional calculation results like authentication token.

Further, there is no delay or sacrifices of performance of the SIM, so that UE or user would not experience any difference to notice SIM is not local to the UE. The implementation is relying on the high speed of 5G technology where data rate is high and error rate is low. Locally, there is no longer a need for dedicated memory storage on the UE for the eSIM, and further, there is no longer a need for downloading, erasing, overwriting or re-downloading of eSIM content.

With 5G, the speed of connection is capable of doing so in real-time (i.e., in millisecond or lower). More specifically, with 5G, one of the improvements is speed of uplink and downlink, no longer forcing the content of the SIM card to be physically stored or available on the UE.

Figure 1:
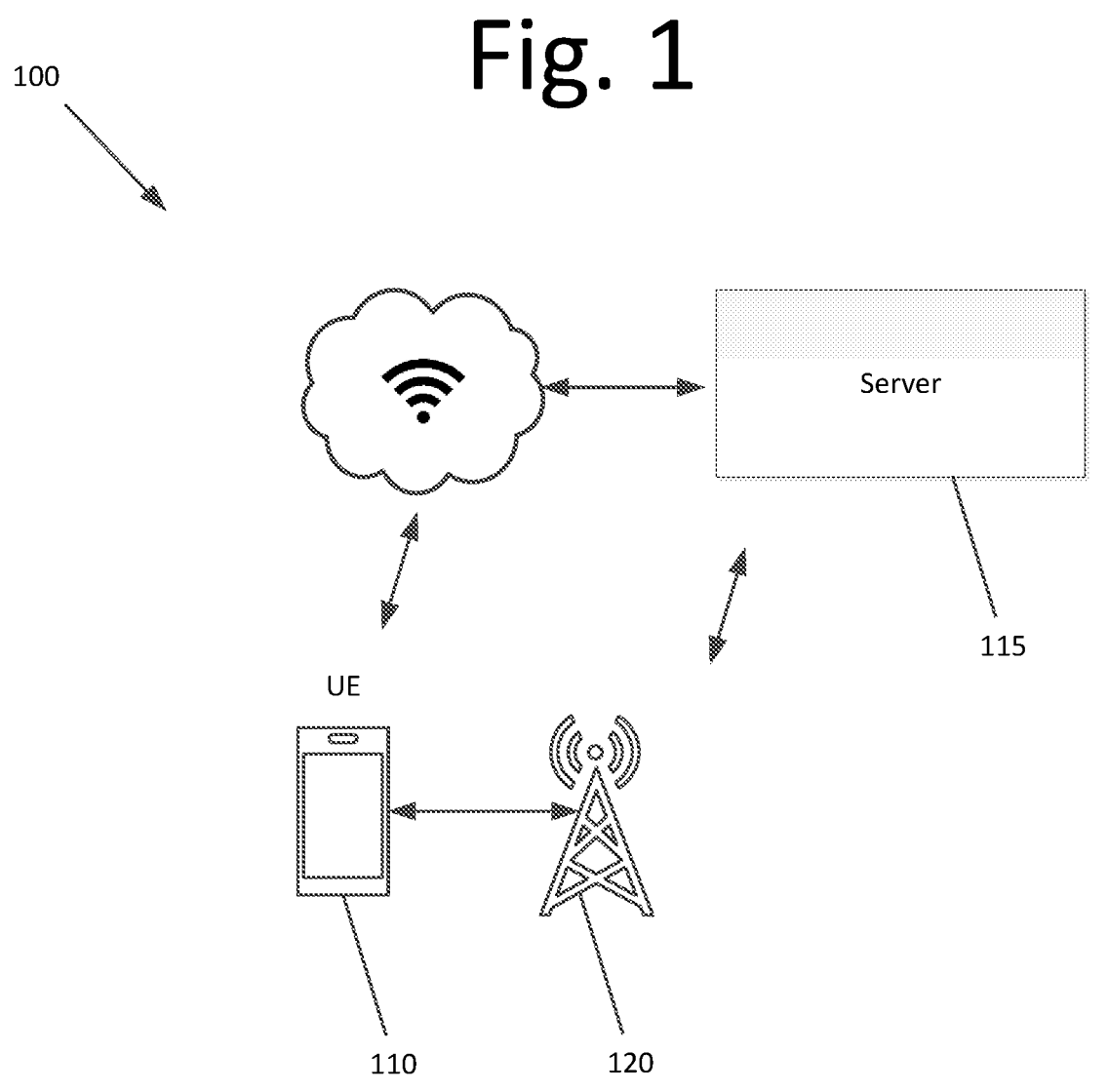

FIG. 1 is an architectural diagram illustrating a cloud SIM network 100, according to an embodiment of the present invention. In some embodiments, UE 110 may store an application such as that shown in FIG. 3 (e.g., cloud SIM communication module 315). The application, which when executed, connects to the Cloud SIM software on the cloud (e.g., server 115) via Wi-Fi network or a base station (or node) 120. This application may send a request to the cloud SIM software and may wait for the response from the cloud SIM software. This is different from the current technology where the local SIM card software (i.e., the sim card on UE 110) communicates with the hardware of UE 110. This improvement eliminates the logistics problem.

Let's say for example that when a user buys a mobile phone, the mobile phone may need to download the content of the SIM card to the local chip to host the local content to operate the mobile phone. With cloud SIM software, there is no longer a need to maintain a physical SIM card or an eSIM card within the mobile phone or UE 110. Further, with cloud SIM software, whenever content is requested, UE 110, using locally stored software, may access the cloud SIM software.

This is the opposite of how SIM technology works right now, i.e., the UE 110 communicates with the SIM card via a protocol based on the ISO Standard 7186. ISO Standard 7186 defines communication between the SIM card and UE 110. The communication protocol, due to the number of bytes, is not great, leading to slower execution times.

Currently, the protocol between UE 110 and SIM, for local direct communication, is based on ISO standard 7816. The protocol is a command-response model with Application protocol data unit (APDU) format, and the data transmitted is limited to less than 300 bytes per transmission.

There are also existing Over The Air (OTA) specifications, such as ETSI TS 102 225 and ETSI TS 102 226 specifications, that defines the communication protocol between OTA server and UE/SIM, to remotely control the execution of APDU commands.

In the cloud-based SIM embodiments described herein, the SIM (or cloud SIM software) is with server 115 and not with UE 110, so the protocols will have to be adapted to deliver the command/response, as well as to be more efficient for data exchange. In some embodiments, an existing protocol, or an improve UE/SIM protocol, may be used.

FIG. 2 is a flow diagram illustrating a process 200 for connecting to the cloud SIM software to increase execution time, according to an embodiment of the present invention. In some embodiments, process 200 includes executing, on UE, a cloud SIM communication module, to connect with a cloud SIM software located on a remote server at 205. At 210, the cloud SIM communication module sends a request to the cloud SIM software and waits for a response from the cloud SIM software. In some embodiments, the request may include instructions to retrieve SIM status, the SIM's file structure, and contents of the SIM. In some additional embodiments, the request may include instructions for the SIM to execute functional operations and deliver the results of such functional operations. Functional operations may include, but are not limited to, token authentication, communication to another UE, and so forth. At 215, cloud SIM communication module downloads (or receives) content from cloud SIM software to a local chip on the UE. Specifically, the content that is downloaded is used by the UE to operate the UE.

It should be appreciated that, after step 205, both the UE and cloud SIM software remember the established communication channel. In other words, both the UE and cloud SIM software maintain the established communication channel. This way, connection is never lost. By remembering the established connection with cloud SIM software, data transmission occurs between the UE and cloud SIM software whenever there is a need from either side. Further, the request and response are continuous, not a one-time transaction. There is no specific functional or essential eSIM parts to "download", and certainly not the same as current eSIM download technology. Data is requested and consumed in real-time.

In some embodiments, the flow diagram shown in FIG. 2 is one active session, i.e., starts with a connection between the UE and the cloud SIM software and ends with a lost connection. The same flow diagram of FIG. 2 may be reinitiated when the condition for reconnection restores, resulting in another active connection. This other active connection continues until the connection is lost, for example.

Figure 3:
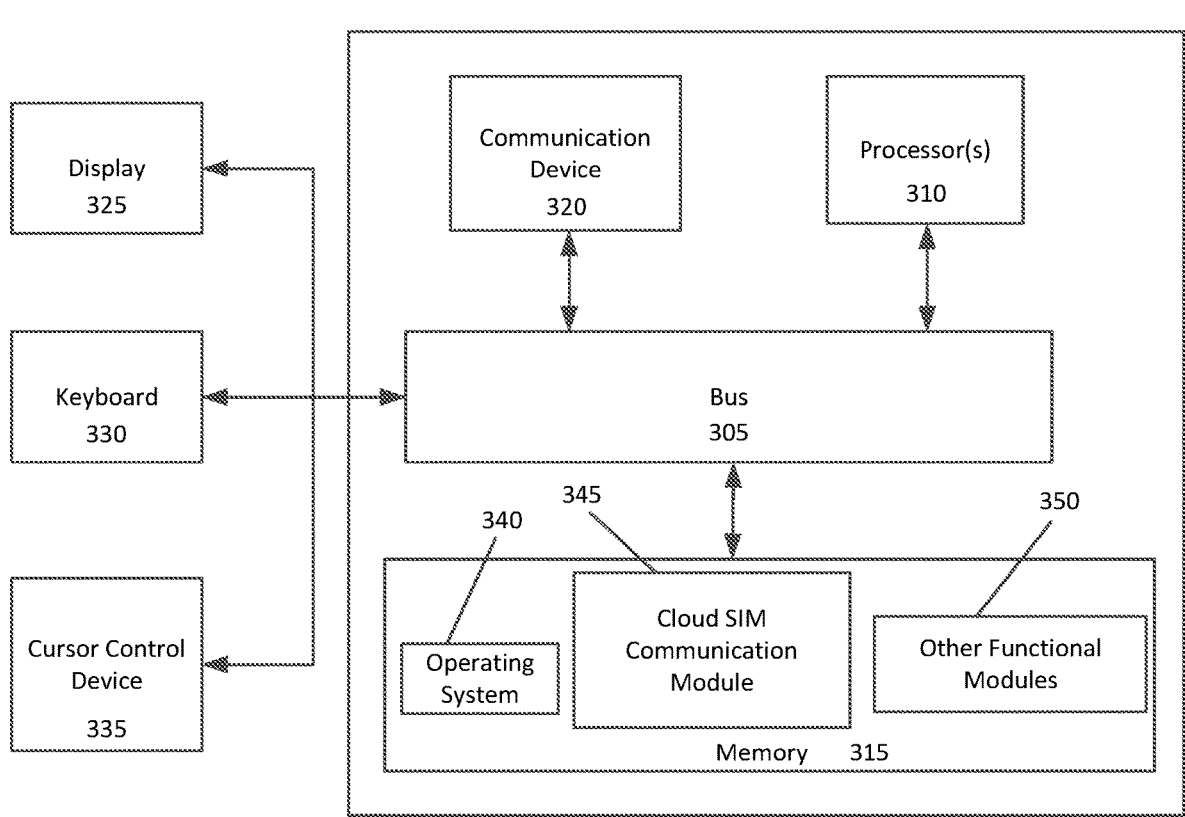
FIG. 3 is an architectural diagram illustrating UE configured to facilitate communication between the UE and the cloud-based SIM server, according to an embodiment of the present invention.

FIG. 3 is an architectural diagram illustrating a UE 110 configured to facilitate communication between the UE and the cloud SIM server, according to an embodiment of the present invention. UE 110 includes a bus 305 or other communication mechanism for communicating information, and processor(s) 310 coupled to bus 305 for processing information. Processor(s) 310 may be a specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 310 may also have multiple processing cores, and at least some of the cores may be configured to perform specific functions. Multi-parallel processing may be used in some embodiments. In certain embodiments, at least one of processor(s) 310 may be a neuromorphic circuit that includes processing elements that mimic biological neurons. In some embodiments, neuromorphic circuits may not require the typical components of a Von Neumann computing architecture.

UE 110 further includes a memory 315 for storing information and instructions to be executed by processor(s) 310. Memory 315 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 310 and may include volatile media, non-volatile media, or both. The media may also be removable, non-removable, or both.

Additionally, computing system 310 includes a communication device 320, such as a transceiver, to provide access to a communications network via a wireless and/or wired connection. In some embodiments, communication device 320 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 420 may include one or more antennas that are singular, arrayed, phased, switched, beamforming, beam-steering, a combination thereof, and or any other antenna configuration without deviating from the scope of the invention.

Processor(s) 310 are further coupled via bus 305 to a display 325, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 325 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 330 and a cursor control device 335 are further coupled to bus 305 to enable a user to interface with computing system 110. However, in certain embodiments, the user may interact with UE 110 solely through display 325 and/or a touchpad (not shown) but may be used as a keyboard 330 and a cursor control device 335. Any type and combination of input devices may be used as a matter of design choice. In certain embodiments, no physical input device and/or display is present. For instance, the user may interact with UE 110 remotely via another computing system in communication therewith, or UE 110 may operate autonomously.

Memory 315 stores software modules that provide functionality when executed by processor(s) 310. The modules include an operating system 340 for computing system 110. The modules further include a cloud SIM communication module 345 that is configured to perform all or part of the processes described herein or derivatives thereof. UE 110 may include one or more additional functional modules 350 that include additional functionality.

One skilled in the art will appreciate that a "UE" may operate as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIG. 2 may be performed by computer program(s), encoding instructions for the processor(s) to perform at least part of the process(es) described in FIG. 2, in accordance with embodiments of the present invention. The computer program(s) may be embodied on non-transitory computer-readable media. The computer-readable media may be, but are not limited to, a hard disk drive, a flash device, RAM, a tape, and/or any other such medium or combination of media used to store data. The computer program(s) may include encoded instructions for controlling processor(s) of computing system(s) (e.g., processor(s) 310 of UE 110 of FIG. 3) to implement all or part of the process steps described in FIG. 2, which may also be stored on the computer-readable medium.

The computer program(s) can be implemented in hardware, software, or a hybrid implementation. The computer program(s) can be composed of modules that are in operative communication with one another, and which are designed to pass information or instructions to display. The computer program(s) can be configured to operate on a computing system, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for communicating with a cloud SIM software, comprising:
    activating, on a mobile device, a communication module configured to communicate with the cloud SIM software;
    connecting, by the mobile device, the communication module with the cloud SIM software located on a remote server;
    sending, from the mobile device, a request for content from the communication module to the cloud SIM software;
    receiving, by the mobile device, the content from the cloud SIM software to a local chip on the mobile device, the content is configured to facilitate communication between the mobile device and one or more other mobile devices;
    maintaining, by the mobile device, a communication channel between the communication module and the cloud SIM software once the content is stored on the local chip of the mobile device; and
    reinitiating, by the mobile device, a connection between the communication module and the cloud SIM software when a communication channel is lost.

2. The computer-implemented method of claim 1, further comprising:
    performing, by a mobile network operator, a provisioning process for where the cloud SIM software is stored.

3. The computer-implemented method of claim 2, wherein the performing of the provisioning process comprises
    assigning an eSIM stored in the remote server to a registering mobile device, establishing a communication channel between the mobile device and the assigned eSIM.

4. The computer-implemented method claim 3, wherein the request comprises instructions for the eSIM to execute functional operations and deliver one or more results of the functional operations.

5. The computer-implemented method of claim 4, wherein the content comprises authentication, security token, or content of the SIM card.

6. A system, comprising:
    a mobile device configured to
        activate a communication module;
        connect the communication module with a cloud SIM software located on a remote server;

send a request from the communication module for content to the cloud SIM software;

receive the content from the cloud SIM software to a local chip on the mobile device, facilitating communication between the mobile device and one or more other mobile devices;

maintain a communication channel between the communication module and the cloud SIM software once the content is stored on the local chip of the mobile device; and reinitiate a connection between the communication module and the cloud SIM software when a communication channel is lost.

7. The system of claim 6, further comprising:

a mobile network operator configured to perform a provisioning process for where the cloud SIM software is stored.

8. The system of claim 7, wherein the mobile network operator is further configured to assign an eSIM stored in the remote server to a registering mobile device, thereby establishing a communication channel between the mobile device and the assigned eSIM.

9. The system of claim 8, wherein the request comprises instructions for the eSIM to execute functional operations and deliver one or more results of the functional operations.

10. The system of claim 9, wherein the content comprises authentication, security token, or content of the SIM card.

11. A mobile device, comprising:

memory comprising a set of instructions; and at least one processor, wherein the set of instructions are configured to cause the at least one processor to execute

10 sending a request from a communication module for content to a cloud SIM software;

receiving the content from the cloud SIM software to a local chip on the mobile device to facilitate communication between the mobile device and one or more other mobile devices, wherein the communication module is located on the mobile device and the cloud SIM software is located on a remote server:

maintaining a communication channel between the communication module and the cloud SIM software until the communication channel is lost; and reinitiating a connection between the communication module and the cloud SIM software when the communication channel is lost.

12. The mobile device of claim 11, wherein the set of instructions are further configured to cause the at least one processor to execute activating on the mobile device the communication module for connection with the cloud SIM software.

13. The mobile device of claim 12, wherein the set of instructions are further configured to cause the at least one processor to execute upon activating the communication module, connecting the communication module with the cloud SIM software.

14. The mobile device of claim 11, wherein the content comprises authentication, security token, or content of the SIM card.

* * * * *